(12) United States Patent
Hashiba et al.

(10) Patent No.: US 7,678,308 B2
(45) Date of Patent: Mar. 16, 2010

(54) MOLDED WOODY ARTICLE AND PROCESS FOR PRODUCING MOLDED WOODY ARTICLE

(75) Inventors: Masanori Hashiba, Kariya (JP); Hideki Kawashiri, Kariya (JP); Kenichi Ioroi, Amagasaki (JP); Kouichi Matsui, Amagasaki (JP)

(73) Assignees: Toyota Boshoku Kabushiki Kaisha, Aichi (JP); NOF Corporation, Tokyo (JP)

( * ) Notice: Subject to any disclaimer, the term of this patent is extended or adjusted under 35 U.S.C. 154(b) by 781 days.

(21) Appl. No.: 10/594,303

(22) PCT Filed: Mar. 25, 2005

(86) PCT No.: PCT/JP2005/005497

§ 371 (c)(1),
(2), (4) Date: Sep. 26, 2006

(87) PCT Pub. No.: WO2005/097445

PCT Pub. Date: Oct. 20, 2005

(65) Prior Publication Data

US 2007/0197736 A1    Aug. 23, 2007

(30) Foreign Application Priority Data

Apr. 1, 2004  (JP) .............................. 2004-109122

(51) Int. Cl.
*B27N 3/00* (2006.01)

(52) U.S. Cl. .......................................... 264/109; 524/9
(58) Field of Classification Search ....................... None
See application file for complete search history.

(56) References Cited

U.S. PATENT DOCUMENTS 7,445,835 B2 * 11/2008 Serizawa et al. ......... 428/297.4

FOREIGN PATENT DOCUMENTS

| JP | 10-287815 | 10/1998 |
|---|---|---|
| JP | 2001-335626 | 12/2001 |
| JP | 2003-55871 | 2/2003 |
| JP | 2003-277621 | 10/2003 |
| JP | 2003-286369 | 10/2003 |
| JP | 2003-321593 | 11/2003 |

* cited by examiner

*Primary Examiner*—Mary Lynn F Theisen
(74) *Attorney, Agent, or Firm*—Patterson, Thuente, Skaar & Christensen, P.A.

(57) ABSTRACT

A method for manufacturing a molded article includes the step of pressing a pre-molding material that is prepared by dispersing a polylactic acid-base aliphatic polyester and a compatible copolymer into kenaf fibers. The compatible copolymer contains a first polymerizable monomer and a second polymerizable monomer. The pressing step is performed at a temperature that permit the polylactic acid-base aliphatic polyester to be changed to a softened state or a molten state. The first polymerizable monomer has a polymerizable double bond part and a hydrophilic group. The second polymerizable monomer has a polymerizable double bond part and an epoxy group.

6 Claims, 1 Drawing Sheet

MOLDED WOODY ARTICLE AND PROCESS FOR PRODUCING MOLDED WOODY ARTICLE

TECHNICAL FIELD

The present invention relates to a molded woody article in which kenaf fibers are bonded to each other by a resin and a method for manufacturing the molded woody article. More particularly, the present invention relates to a molded woody article in which kenaf fibers are bonded to each other by a thermoplastic resin and a method for manufacturing the molded woody article.

BACKGROUND ART

Certain molded articles, such as a board, are known. A known molded article is formed by bonding a woody material such as kenaf fibers to each other using a biodegradable thermoplastic resin, e.g., an acetylcellulose-base resin, a chemically denatured starch-base resin, or an aliphatic polyester-base resin (for example, Patent Document 1). The biodegradable resin has the advantage of being able to reduce consumption of a petroleum resource. In particular, methods of using polylactic acid have developed because polylactic acid can be mass-produced by biosynthesis.

Patent Document 1: JP 2003-55871 A

DISCLOSURE OF THE INVENTION

Problems to be Solved by the Invention

Meanwhile, kenaf fibers have a high water absorbing property and a swelling property. Accordingly, when a molded article containing kenaf fibers is exposed to a high humidity environment, thickness of the molded article may increase due to swelling of the kenaf fibers. Bending strength or other such properties of the molded article may also be reduced. In particular, a molded article that contains a biodegradable resin as a binding resin or binder may be more degraded than a molded article that contains another resin functioning as the binder when they are exposed to a high temperature and high humidity environment. It is considered that such a high degradability results from hydrolysis that can be promoted by water absorbed by the kenaf fibers. In addition, in a molded article in which a polyester such as a polylactic acid-base resin is used as the binder, the molded article may be significantly degraded upon exposure to the high temperature and high humidity environment. This significant degradability is considered that the polyester has a reduced affinity for the kenaf fibers. In order to increase durability of such a molded article against humidity, i.e., moisture resistance, an additive ratio of the binder resin can be increased in the molded article. However, such a method is not desirable because it may result in an increased weight of the molded article as well as an increased manufacturing cost of the molded article.

It is, accordingly, one object of the present invention to provide a method for manufacturing a molded article containing kenaf fibers in which its moisture resistance is increased while an additive ratio of a binder resin is not substantially increased. It is another object of the present invention to provide a molded article containing kenaf fibers in which its moisture resistance is increased while an additive ratio of a binder resin is not substantially increased.

Means for Solving the Problems

In order to achieve the above objects, an aspect of the present invention is to provide a molded article that includes kenaf fibers and polylactic acid, wherein the molded article has an apparent density not greater than 0.7 g/cm$^3$, and wherein bending strength of the molded article after the molded article is exposed to an environment of temperature of 50° C. and 95% relative humidity for 1,200 hours is not less than 60% of bending strength of the molded article before exposure. This molded article has a relatively light weight and a increased moisture resistance.

An another aspect of the present invention is to provide a method for manufacturing a molded article that includes the step of pressing a pre-molding material that is prepared by dispersing a polylactic acid-base aliphatic polyester and a compatible copolymer into kenaf fibers. The compatible copolymer contains a first polymerizable monomer and a second polymerizable monomer as raw materials. The pressing step is performed at a temperature that permit the polylactic acid-base aliphatic polyester to be changed to a softened state or a molten state. The method is characterized in that the first polymerizable monomer has a polymerizable double bond part and a hydrophilic group, and that the second polymerizable monomer has a polymerizable double bond part and an epoxy group. According to this method, the compatible copolymer has affinity for the kenaf fibers due to the hydrophilic group derived from the first polymerizable monomer. Also, the compatible copolymer has affinity for the polylactic acid-base aliphatic polyester due to the epoxy group derived from the second polymerizable monomer. Therefore, in the pressing step, the compatible copolymer sufficiently bonds to both of the kenaf fibers and the polylactic acid-base aliphatic polyester, thereby increasing bonding strength between the kenaf fibers and the polylactic acid-base aliphatic polyester. Further, at a temperature not less than the melting point of the polylactic acid-base aliphatic polyester, the compatible copolymer may appropriately bond to the polylactic acid-base aliphatic polyester under the influence of water or other such ingredients. This bond may increase the molecular weight of the polylactic acid-base aliphatic polyester or provide a three-dimensional structure. As a result, the moisture resistance of the resultant molded article can be enhanced without increasing an additive ratio of a binder resin.

In a preferred embodiment of the method, the first polymerizable monomer contains an alkylene oxide group as the hydrophilic group. According to the method, there is no possibility that hydrolysis of the polylactic acid-base aliphatic polyester is promoted by the hydrophilic group of the first polymerizable monomer. Therefore, it is possible to obtain the molded article in which the polylactic acid-base aliphatic polyester having a large molecular weight can be reliably retained therein.

In another preferred embodiment of the method, a weight ratio of a sum of the first polymerizable monomer and the second polymerizable monomer to the polylactic acid-base aliphatic polyester is 0.1 to 10 wt %. According to this method, properties provided by the kenaf fibers and the polylactic acid-base aliphatic polyester are reliably maintained, and a weight increase of the molded article due to the first and second polymerizable monomers is suppressed. Therefore, it is possible to obtain the molded article in which a bonding strength between the kenaf fibers and the polylactic acid-base aliphatic polyester is increased and of which the moisture resistance is improved.

In another preferred embodiment of the method, the first polymerizable monomer is methoxypolyethylene glycol mono(meta) acrylate, and the second polymerizable monomer is glycidyl(meta) acrylate. According to this method, the polymerizable monomers may have excellent characteristics in two points, i.e., polymerizability, and adhesiveness to both of the kenaf fibers and the polylactic acid-base aliphatic polyester. Therefore, it is possible to reliably increase the bonding strength between the kenaf fibers and the polylactic acid-base aliphatic polyester.

Also, in another preferred embodiment of the method, the method includes the step of applying the kenaf fibers with an aqueous dispersion of the polylactic acid-base aliphatic polyester and the compatible copolymer, thereby forming the pre-molding material. According to this method, it is possible to easily apply the kenaf fibers with the polylactic acid-base resin and the first and second polymerizable monomers at a desired ratio and in a dispersed condition.

In still another preferred embodiment of the method, the method includes the step of mixing the kenaf fibers with binder fibers that contain the polylactic acid-base aliphatic polyester and the compatible copolymer, thereby forming the pre-molding material. According to this method, the first and second polymerizable monomers can be dispersed in the kenaf fibers in a condition that these monomers more closely contact the polylactic acid-base aliphatic polyester. Therefore, these monomers can be efficiently positioned between the kenaf fibers and the polylactic acid-base aliphatic polyester, so as to increase the bonding strength between the kenaf fibers and the polylactic acid-base aliphatic polyester.

Effects of the Invention

According to the present invention, it is possible to manufacture a molded article in which a weight increase thereof is suppressed, and which can be used under a high humidity environment.

BEST MODE FOR CARRYING OUT THE INVENTION

Figure 1:
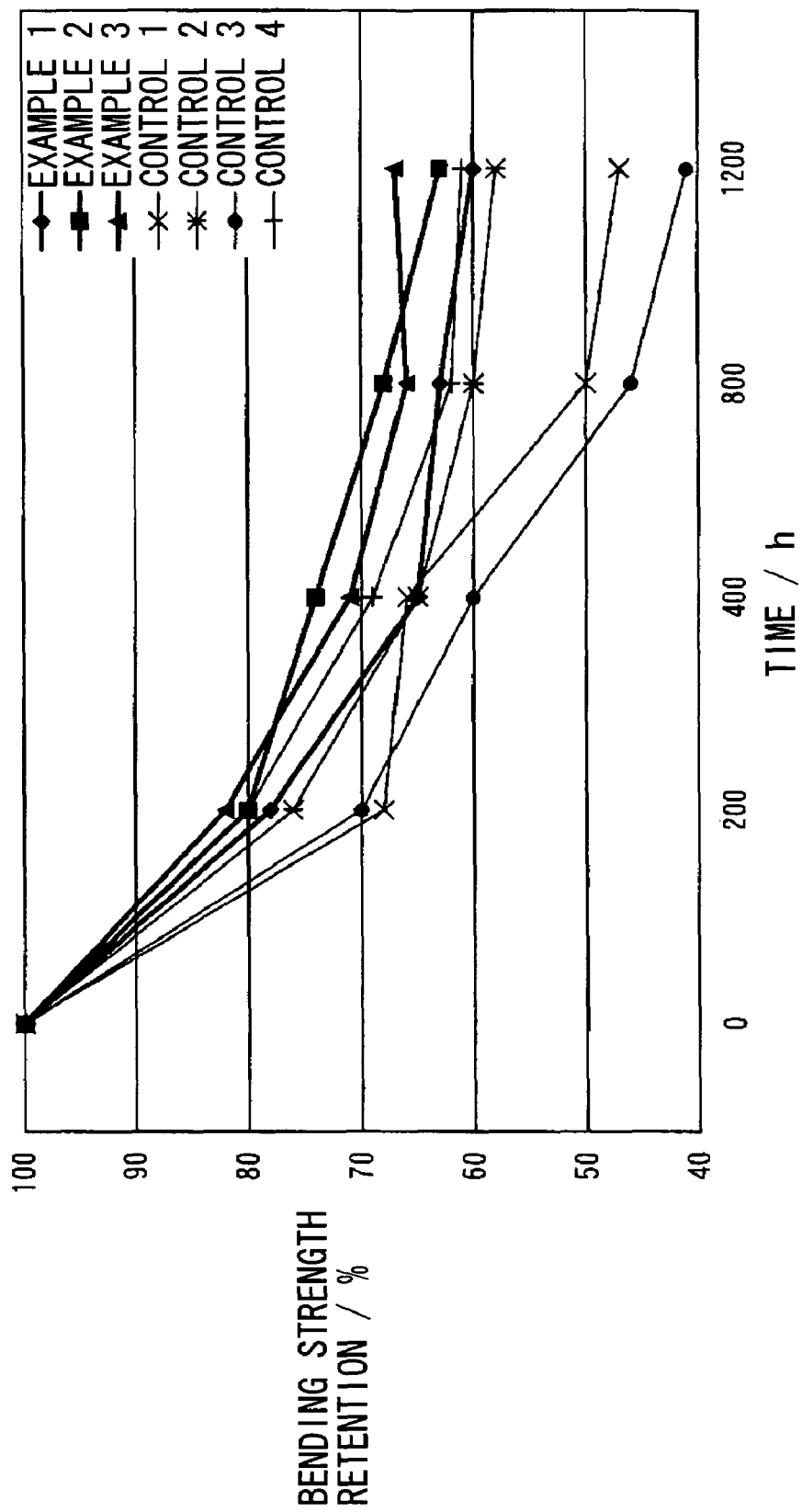
FIG. 1 is a line graph illustrating a change in bending strength of Examples 1 to 3 and Controls 1 to 4 with time.

The best mode for carrying out the present invention will be described hereinafter. A molded woody article manufactured by the present invention is generally, but is not limited to, a board which is composed of one or more layers and which is appropriately subjected to bend molding or draw molding. The molded woody article is preferably applied, but is not limited to, members for composing an interior surface of a vehicle, a building, a ship and the like, i.e., interior wall materials, flooring materials, ceiling materials, surface covering materials of furniture or other such materials. In the vehicle, the molded woody article can be used as so-called automobile interior parts, e.g., a door trim, an instrument panel, a pillar cover or other such members.

A method for manufacturing a molded article according to an embodiment of the present invention will be described hereinafter. The molded article is obtained by press molding a pre-molding material that contains kenaf fibers, a polylactic acid-base aliphatic polyester as a binder and a compatible copolymer after it is heated to a temperature not less than the melting point of the polylactic acid-base aliphatic polyester.

The kenaf fibers means fibers collected from bast parts of kenaf that is an annual herb belonging to *Plantae Malvaceae*. Fiber length of the kenaf fibers may preferably be not less than 30 mm, more preferably, in the range of not less than 30 mm to not greater than 50 mm. In addition, diameter of the kenaf fibers may preferably be not greater than 1.0 mm, more preferably, not greater than 0.1 mm. In a case that the fiber length is less than 30 mm, it is possible that a bending property is not increased. In addition, when the diameter is greater than 1.0 mm, the bending property may be reduced. Further, fibers having sizes outside the above-described ranges may be contained depending on a fiber manufacturing method. It is preferable that a content of such inappropriate fibers is maintained to be not more than 3%.

Optionally, the kenaf fibers may be obtained via a known mechanical or chemical defibration. Preferably, the kenaf fibers may be kenaf fibers that are chemically defibrated by a known pulping method or a microbial treatment. In chemically defibrated fibers, non-fiber components, e.g., lignin and hemi-cellulose, are at least partially removed from the fibers. Therefore, such chemically defibrated fibers have flexibility, so that the molded article may have sufficient bending strength due to fiber entanglement or other such mechanisms.

A content of the kenaf fibers is, but is not limited to, for example, in the range of not less than 50 wt % to not greater than 90 wt % relative to the molded article. When the kenaf fiber content is less than 50 wt %, the amount of the binder resin increases, thereby increasing a weight of the molded article and a manufacturing cost of the molded article. To the contrary, when the kenaf fiber content is greater than 90 wt %, the binder resin may not have sufficient binding performance, thereby reducing the strength of the molded article and resulting in debonding of the fibers. Preferably, the content of the kenaf fibers in the molded article is in the range of not less than 50 wt % to not greater than 70 wt %.

The kenaf fibers can be obtained by previously defibrating kenaf utilizing biodegradation or pulping and then by loosening the defibrated kenaf utilizing a turbo feeder or other such devices. The kenaf fibers may be previously treated by entangling, preforming or other such methods, so as to have a desired shape. Also, the kenaf fibers may be assembled at a desired amount. For example, the kenaf fibers can be assembled by carding, fleecing, aerating or other such methods, thereby forming webs. In addition, webs can be combined with each other by needle punching or other such methods, so as to have a desired shape. Alternatively, in a case that the binder resin is used in a fibrous form, which will be described hereinafter, the binder resin can easily bond the kenaf fibers to each other by the preforming step. Preferably, the kenaf fibers are preformed to a desired shape such as a mat shape and a thick plate shape before they are press formed. More preferably, the preformed kenaf fibers are combined with each other by needle punching.

Examples of the polylactic acid-base aliphatic polyester as the binder resin may include polymers or copolymers of oxyacids such as lactic acid, malic acid and glucose acid; and dibasic acid polyesters such as polybutylene succinate, polyethylene succinate and polybutylene adipate. More preferable examples of the binder resin may include polylactic acid; and hydroxycarboxylic acid-base aliphatic polyesters such as copolymers of polylactic acid and any other hydroxycarboxylic acid, polycaprolactone, copolymers of caprolactone and any other hydroxycarboxylic acid and poly-3-hydroxybutyrate esters.

An additive ratio of the binder resin to the kenaf fibers may preferably be reduced as soon as possible. The reduced additive ratio of the binder resin may reduce a weight of the obtained molded article and a cost due to the binder resin. However, if the amount of the binder resin is excessively reduced, a bonding force between the kenaf fibers may be reduced and a part of the kenaf fibers may not be bonded. As a result, the strength of the molded article may be reduced and the kenaf fibers could become be debonded. In addition, such a excessively reduced amount of binder resin may reduce a resistive force against a swelling force of the kenaf fibers due to water absorption, so that the molded article may be easily degraded when exposed to a high humidity environment. Therefore, the content of the binder resin in the pre-molding material may preferably be in the range of not less than 10 wt % to not more than 50 wt %, more preferably, the range of not less than 30 wt % to not more than 50 wt %. The more preferable range of content may provide a sufficient bonding and may suppress an increase in weight of the molded article.

The binder resin can be dispersed into the kenaf fibers by a known method. For example, the binder resin can be formed into fibers by a known method. The binder resin formed into the fibers can be supplied to and mixed with the kenaf fibers when the kenaf fibers are defibrated. Therefore, the pre-molding material in which the binder resin is uniformly dispersed can be prepared by forming the kenaf fibers mixed with the fibrous binder resin into webs, and by combining the webs or pressing the webs at a temperature that permits the binder resin to be softened.

Alternatively, the binder resin can be dissolved or dispersed in an organic solvent or water in order to prepare a fluid. The binder resin can be applied to the kenaf fibers by applying the fluid to the kenaf fibers. The solvent or dispersion medium may preferably be water because water does not deteriorate a working environment when it is evaporated due to drying. The polylactic acid-base aliphatic polyester is generally insoluble in water. Accordingly, an organic solvent can be used in order to prepare a solution of the binder resin, and water can be used in order to prepare a dispersion liquid of the binder resin. For example, the polylactic acid-base aliphatic polyester is dissolved in the organic solvent. Thereafter, the dissolved polylactic acid-base aliphatic polyester is added to water with a dispersing agent and is stirred in order to remove the solvent, thereby preparing an aqueous dispersion of the polylactic acid-base aliphatic polyester. Alternatively, the aqueous dispersion can be easily prepared simultaneously with emulsion polymerization of the mixture. The binder resin prepared as the fluid can be applied to the kenaf fibers using a known application method such as a spray or a roller. Alternatively, the binder resin can be applied to the kenaf fibers by dipping the binder resin into a bath containing the binder resin fluid.

The compatible polymer is a polymer that has an affinity for both of the kenaf fibers and the polylactic acid-base aliphatic polyester. The kenaf fibers are mainly composed of cellulose and contain many hydroxyl groups. Therefore, the kenaf fibers have highly polarized or hydrophilic surfaces. Accordingly, the kenaf fibers are highly compatible with materials having highly polarized or hydrophilic surfaces. To the contrary, the polylactic acid-base aliphatic polyester is a polymer that has alkyl chains and alkoxycarbonyl chains as main constituent groups, and has large lipophilicity. Accordingly, the polylactic acid-base aliphatic polyester has a less compatibility with or a less affinity for the kenaf fibers having large polarity, and is highly compatible with materials having less polarized surfaces.

Thus, the compatible polymer is a polymer having a hydrophilic part that has an affinity for the kenaf fibers and a lipophilic part that has an affinity for the polylactic acid-base aliphatic polyester. The compatible polymer may preferably be a polymer in which the lipophilic part and the hydrophilic part are dispersed into a polymer chain. In such a polymer, the kenaf fibers and the polylactic acid-base aliphatic polyester are bound to each other, so that the bonding strength between the kenaf fibers and the polylactic acid-base aliphatic polyester can be reliably increased. Such a compatible polymer can generally be a polymer having a hydrophilic group and a lipophilic group as side chains. Such a polymer can be obtained by polymerizing a raw material that contains a first polymerizable monomer having a polymerizable double bond and the hydrophilic group and a second polymerizable monomer having a polymerizable double bond part and the lipophilic group.

The first polymerizable monomer has the polymerizable double bond part and the hydrophilic group. The polymerizable double bond is typically a vinyl group, or a vinyl group in which one hydrogen atom is replaced by a methyl group or other such groups. For example, esters of acrylic acid or methacrylic acid can be used. In addition, examples of the hydrophilic group may include, but are not limited to, a hydroxyl group, alkylene oxide chains, a quaternary ammonium group, and a sulfonic group or a salt thereof. Examples of the first polymerizable monomer may include vinyl alcohol, 2-hydroxyethyl(meta) acrylate, dihydroxypropyl(meta) acrylate, glycerol di(meta) acrylate, polyethylene glycol mono(meta) acrylate, methoxypolyethylene glycol mono (meta) acrylate, polypropylene glycol mono(meta) acrylate, polyethylene glycol polypropylene glycol mono(meta) acrylate, 2-sulfoethyl(meta) acrylate, (meta) acryloyloxytrimethylammonium chloride, (meta) acryloyloxyhydroxypropyltrimethylammonium chloride, (meta) acryloyloxytriethylammonium chloride, (meta) acryloyloxytrimethylammonium methyl sulfate, trimethyl-3-methacrylamidopropylammonium chloride, sodium salts of vinyl sulfonate, ammonium salts of allyl sulfonate and triethylamine salts of methallyl sulfonate. These compounds can be used solely or in combination with each other. In order to suppress hydrolysis of the binder resin, the first polymerizable monomer may preferably be the hydrophilic group that contains no active hydrogen or cannot easily generate active hydrogen. For example, alkylene oxide chains are preferable. An ethylene oxide chain and a propylene oxide chain are preferable, methoxypolyethylene glycol mono(meta) acrylate is more preferable.

The second polymerizable monomer has the polymerizable double bond part and the lipophilic group. The lipophilic group may preferably be an epoxy group because the epoxy group is extremely highly compatible with the aliphatic polyester. In addition, the epoxy group has activity for a bonding reaction with the polylactic acid-base aliphatic polyester at the softening temperature (including temperatures not less than the melting point) of the polylactic acid-base aliphatic polyester, so as to contribute improvement of durability of the polylactic acid-base aliphatic polyester at a high temperature and humidity. Similar to the first polymerizable monomer, the polymerizable double bond part of the second polymerizable monomer is typically a vinyl group or a vinyl group in which one hydrogen atom is replaced by a methyl group or other such groups. For example, esters of acrylic acid or methacrylic acid can be used. The second polymerizable monomer may preferably have the epoxy group, and may preferably be glycidyl(meta) acrylate.

The ratio of the first polymerizable monomer to the second polymerizable monomer in the compatible polymer is not particularly limited. Accordingly, the first polymerizable monomer and the second polymerizable monomer can be blended at a desired ratio in the range of 1:9 to 9:1 by weight. Preferably, the ratio is adjusted such that the compatible polymer may have substantially the same affinity for the kenaf fibers as the affinity for the polylactic acid-base aliphatic polyester. Therefore, the ratio between the first polymerizable monomer and the second polymerizable monomer may preferably be 1:1. Such a ratio may equalize the affinity between the compatible polymer and the kenaf fibers and the affinity between the compatible polymer and the polylactic acid-base aliphatic polyester, thereby providing an excellent bonding force.

Of course, the compatible polymer may be produced by polymerizing any other polymerizable monomers together with the first and second polymerizable monomers. For example, the compatible polymer may contain (meta) acrylic acid having a straight-chain alkoxylate such as lauryl acrylate. It is possible to, for example, control the steric regularity of the compatible polymer by incorporating any other polymerizable monomer thereinto. The compatible polymer can be produced from monomers having a polymerizable double bond by utilizing known polymerizing methods, e.g., a radical polymerization reaction or an addition polymerization reaction. Therefore, a detailed description of polymerizing methods of the compatible polymer will be omitted.

The molecular weight of the compatible polymer may preferably be, but is not limited to, in the range of not less than 5,000 to not more than 100,000, more preferably, in the range of 10,000 to 30,000. When the molecular weight is less than 5,000, the compatible polymer may bleed, so that the molded article may have an inferior appearance. To the contrary, when the molecular weight is greater than 100,000, the compatible polymer may have a reduced compatibilization performance, so that the molded article may have a reduced bending property. The compatible polymer having a molecular weight of 10,000 to 30,000 is more preferable because such a polymer cannot easily bleed and has good compatibility.

An additive ratio of the compatible polymer to the kenaf fibers can be, but is not limited to, preferably small to the extent that the compatible polymer provide a desired effect. Such a reduced ratio of compatible polymer can reliably maintain the properties resulting from the kenaf fibers and the polylactic acid-base aliphatic polyester. In addition, such a reduced ratio of compatible polymer may suppress an increase in weight and cost of the molded article. For example, the additive ratio of the compatible polymer to the binder resin may preferably be 1.0 to 10.0 wt %.

The compatible polymer can be prepared so as to have a powder form, a liquid form, a fibrous form or other such forms, and can be applied to the kenaf fibers or the binder resin by a method such as mixing or coating. When the binder resin is formed into a fibrous form, the compatible polymer can be applied by dipping. Preferably, the compatible polymer is mixed with the binder resin, so as to form a mixture. The formed mixture is formed into a liquid form or a fibrous form, so as to be applied to the kenaf fibers. According to this method, the compatible polymer can be applied to the kenaf fibers in a condition that the compatible polymer reliably closely contacts the polylactic acid-base aliphatic polyester, i.e., the binder resin. In addition, a reduced amount of the compatible polymer can be uniformly dispersed into the kenaf fibers.

Of course, the pre-molding material can be added with any other supplemental materials. In particular, it is possible to introduce additional components that are expected to promote polymerization of the first and second polymerizable monomers, particularly polymerization with the polylactic acid-base aliphatic polyester. For example, it is possible to add reagents (catalysts) that can promote a dehydration reaction, e.g., a carbodiimide such as dicyclohexyl carbodiimide. The additive ratio of the carbodiimide to the binder resin may be, but is not limited to, 1.0 wt %.

The pre-molding material thus produced can be pressed by a known method under a condition that the polylactic acid-base aliphatic polyester is in a softened state or a molten state, so as to be molded into a desired shape. For example, the pre-molding material is heated with a known heating means such as an oven until the polylactic acid-base aliphatic polyester contained as the binder resin reaches the melting point. Next, the heated pre-molding material is sandwiched between molding dies, for example, upper and lower dies, having a normal temperature, and is cooled to a temperature that permits the polylactic acid-base aliphatic polyester to be solidified. After that, the resultant is appropriately subjected to a known post treatment such as deburring, thereby forming the molded article.

Under a heating condition, the polylactic acid-base aliphatic polyester in the pre-molding material softens and melts. In addition, the epoxy group of the compatible polymer and the ester part of the polylactic acid-base aliphatic polyester may react and polymerize with each other, thereby increasing a molecular weight or forming a three-dimensional structure. In addition, the hydrophilic group of the compatible polymer and the epoxy group are positioned so as to respectively have affinity for the kenaf fibers and the polylactic acid-base aliphatic polyester. Thus, an entire system is stabilized. As a result, strong bonds can respectively be established between the kenaf fibers and the compatible polymer and between the compatible polymer and the polylactic acid-base aliphatic polyester. These bonds are stronger than a bond between the kenaf fibers and the polylactic acid-base aliphatic polyester. Thus, the kenaf fibers and the polylactic acid-base aliphatic polyesters can be rigidly connected to each other.

According to this method for manufacturing a molded article, the binder resin mixed with a small amount of compatible polymer is prepared, and the molded article is produced by a known method. In the molded article thus produced, the weight increase of the molded article is suppressed and the moisture resistance is increased. In particular, when the additive ratio of the compatible polymer to the binder resin is a small ratio, for example, not more than 5% or less than 1%, the molded article having properties of the kenaf fibers and the polylactic acid-base aliphatic polyester and having the improved moisture resistance can be obtained without considerably changing the amounts of the kenaf fibers and the polylactic acid-base aliphatic polyester. Therefore, it is possible to easily apply to manufacture the molded article having the same use as a conventional use.

In particular, when the compatible polymer having an alkylene oxide group as the hydrophilic group and having a glycidyl group as the lipophilic group, substances other than carbon, hydrogen and oxygen cannot be contained in the molded article. Accordingly, there is no possibility of generation of harmful matters resulting from the added compatible polymer when the molded article is incinerated.

In the molded article thus obtained, the amount of the binder resin is comparable to or smaller than that contained in a conventional molded article, so that the weight increase is suppressed. In addition, even if a containing ratio of the kenaf fibers is large, swelling of the fibers in the high humidity environment is suppressed, so that the molded article can be suppressed from degrading when exposed to the high humidity environment. For example, in the molded article produced by the present manufacturing method in which the content of the kenaf fibers in the entire molded article is 70 wt % and of which the apparent density is 0.7 g/cm$^3$, bending strength of the molded article after the molded article is exposed to an environment of temperature of 50° C. and 95% relative humidity for 1,200 hours can be not less than 60% of bending strength of the molded article before exposure.

EXAMPLES

Samples of three examples of the present invention and four controls to be compared with the examples were prepared by the following processes.

Example 1

Prepared was a copolymer that contains methoxypolyethylene glycol monomethacrylate as the first polymerizable monomer, glycidyl methacrylate as the second polymerizable monomer, and lauryl acrylate at a ratio of 49:50:1 (which copolymer is simply referred to as "Copolymer A"). "CARBODILITE HMV-8CA" manufactured by Nisshinbo Industries, Inc. was provided as a polyimide compound. Copolymer A and CARBODILITE were added to polylactic acid (molecular weight: 111,000) and mixed and kneaded. Ratios of Copolymer A and CARBODILITE to the polylactic acid were respectively 5.0 wt % and 1.0 wt %. After that, the resultant mixture was formed into fibers using a known method and was crimped. Thereafter, the resultant fibers were cut so as to have a length of 51 mm, thereby forming composite fibers that contain the compatible copolymer and polylactic acid. Next, the composite fibers were mixed with kenaf bast fibers that were cut so as to have a length of about 65 mm at a ratio of 70:30 by weight. The mixed fibers thus produce were defibrated and were formed into sheets. After that, the sheets were laminated so as to have a basis amount of 1.6 kg/m$^2$, and were then combined by needle punching, thereby forming the mat-shaped pre-molding material. The pre-molding material was sandwiched between two dies heated to 230° C. together with a spacer having a thickness of 2.5 mm, and was press molded at a pressure of 12 kg/cm$^2$ under heat for 40 seconds, thereby forming a pre-molded article. The pre-molded article was heated in an oven heated to 230° C. for 150 seconds, so that the interior side of the pre-molded article was heated to 210° C. Then, the pre-molded article was sandwiched between two dies together with a spacer having a thickness of 2.3 mm and was press molded under a pressure of 12 kg/cm$^2$ for 30 seconds, thereby forming a board.

Example 2

Similar to Example 1, kenaf bast fibers that were cut so as to have a length of about 65 mm were defibrated and were formed into sheets. After that, the sheets were laminated so as to have a basis amount of 0.9 kg/m$^2$, and were then combined by needle punching, thereby forming a mat. Next, Copolymer A in Example 1 was added to a dispersion of polylactic acid. A ratio of Copolymer A to the polylactic acid was 5.0 wt %. Further, the dispersion had a solid content of 30%. The dispersion was applied to the mat-shaped kenaf fibers by spraying such that a weight ratio of the solid content of the dispersion to the kenaf fibers is 30:70, thereby obtaining the pre-molding material. The pre-molding material was sandwiched between two dies heated to 230° C. together with a spacer having a thickness of 2.5 mm, and was press molded at a pressure of 12 kg/cm$^2$ under heat for 80 seconds, thereby forming a pre-molded article. The pre-molded article was heated in an oven heated to 230° C. for 150 seconds, so that the interior side of the pre-molded article was heated to 210° C. Then, the pre-molded article was sandwiched between two dies together with a spacer having a thickness of 2.3 mm and was press molded under a pressure of 12 kg/cm$^2$ for 30 seconds, thereby forming a board.

Example 3

A board was molded in the same manner as in Example 2 except that "CARBODILITE E-04" (manufactured by Nisshinbo Industries, Inc.) as the polyimide compound was added to the dispersion of polylactic acid. A ratio of "CARBODILITE E-04" to the polylactic acid was 1.0 wt %.

(Control 1)

A board was formed in the same manner as in Example 1 except that Copolymer A was not added to polylactic acid.

(Control 2)

A board was formed in the same manner as in Example 1 except that Copolymer A was not added to polylactic acid and that the composite fibers were mixed with kenaf bast fibers at a ratio of 50:50 by weight.

(Control 3)

A board was formed in the same manner as in Example 3 except that Copolymer A was not added to the dispersion of lactic acid.

(Control 4)

A board was formed in the same manner as in Example 3 except that Copolymer A was not added to the dispersion of lactic acid and that the dispersion was applied to the kenaf fibers such that the ratio of the kenaf fibers to polylactic acid is 50:50.

(Evaluation for Moisture Resistance)

First, with regard to each of the formed samples of Examples 1 to 3 and Controls 1 to 4, a weight-average molecular weight of a synthetic resin, a board thickness and bending strength were measured. The board thickness and the bending strength were respectively measured using rectangular test pieces having a width of 50 mm and a length of 150 mm. The bending strength was measured by supporting each of the test pieces at two supporting points such that a distance L between the supporting points is 100 mm, and by applying a load corresponding to 50 mm/min to a central position between the supporting points. The bending strength was determined as a maximum load P immediately before the test piece was ruptured. Further, the radius of curvature of an arc formed of the two supporting points and the load applied point was 3.2 mm. The bending strength was calculated from the following equation.

$$\text{Bending strength (MPa)} = 3PL/2Wt^2$$

P: the maximum load
L: the distance between the supporting points
W: the width of the test piece (50 mm)
t: the thickness of the test piece (2.3 mm)

Next, each of the test pieces was placed in a room having a temperature of 50° C. and a humidity of 95% RH and was left for 200, 400, 600, 800, 1,000 and 1,200 hours. Thereafter, the bending strength was measured in the same manner. In addition, after a laps of 1,200 hours, the weight-average molecular weight and the board thickness were measured. Table 1 shows respective values for respective samples before and after they are exposed a high temperature and humidity environment for 1,200 hours. In addition, change in time of the bending strength of respective samples is shown in FIG. 1.

the binder to the fibers was 30:70, the expansion coefficient was not less than 25%. This demonstrates that, in Examples 1 to 3 having the same additive ratio of the binder, the expansion coefficient can be significantly suppressed. In particular, in Examples 1 and 3 that contained the polyimide compound, the board thickness expansion coefficient was in the order of

TABLE 1

|  | Bending strength/MPa | | Bending strength retention/% | Board thickness/mm | | Board thickness expansion coefficient/% | Weight-average molecular weight | |
| --- | --- | --- | --- | --- | --- | --- | --- | --- |
|  | Before exposure | After exposure |  | Before exposure | After exposure |  | Before exposure | After exposure |
| Example 1 | 38 | 23 | 60 | 2.3 | 2.71 | 18 | 226,000 | 269,000 |
| Example 2 | 40 | 25 | 63 | 2.3 | 2.76 | 20 | 256,000 | 273,000 |
| Example 3 | 42 | 28 | 67 | 2.3 | 2.70 | 17 | 251,000 | 290,000 |
| Control 1 | 34 | 16 | 47 | 2.3 | 2.87 | 25 | 111,000 | 87,000 |
| Control 2 | 36 | 22 | 58 | 2.3 | 2.74 | 19 | 111,000 | 91,000 |
| Control 3 | 40 | 16 | 41 | 2.3 | 2.92 | 27 | 111,000 | 83,000 |
| Control 4 | 41 | 25 | 61 | 2.3 | 2.78 | 21 | 111,000 | 90,000 |

The results show that the bending strength of Examples 1 to 3 was comparable to or higher than that of Controls 1 to 4 that do not contain the compatible polymer. In addition, as shown in FIG. 1, the bending strength is reduced upon exposure to high temperature and humidity. However, a degree of reduction of the bending strength of each of Examples 1 to 3 was more gentle than that of each of Controls 1 and 3 that do not contain the compatible polymer and have the same amount of binder (polylactic acid) as Examples 1 to 3. Also, the degree of reduction of the bending strength of each of Examples 1 to 3 was comparable to or more gentle than that of each of Controls 2 and 4 in which the content of the binder was equal to the content of the kenaf fibers. In Examples 1 to 3, the bending strength of not less than 60% was maintained even after 1,200 hours. In particular, in Examples 2 and 3 in which the compatible polymer and the binder were added in a form of the dispersion, the bending strength of not less than 63% was maintained. These values were higher than the values in Controls 2 and 4 in which the ratio of the kenaf fibers to the binder is 50:50. It was demonstrated that if the compatible polymer is used, it is possible to increase the moisture resistance of the molded article without increasing the amount of the binder, i.e., the weight of the molded article.

Example 3 has a degree of reduction of the bending strength smaller than Example 1. Example 1 has the same additive ratio of the compatible polymer and polyimide as Example 3. However, in Example 1, the binder, the compatible polymer and polyimide were added as the fibers. To the contrary, in Example 3, the binder, the compatible polymer and polyimide were added as the dispersion. Also, Example 2 has a degree of reduction of the bending strength smaller than Example 1. In Example 2, the compatible polymer and the binder were added as the dispersion that did not contain polyimide. This demonstrates that if the binder resin and the compatible polymer are added to the kenaf fibers in the form of dispersion, the moisture resistance can be effectively increased.

Further, in each of Examples 1 to 3, the board thickness was maintained in the order of 2.7 mm even after 1,200 hours. In addition, Examples 1 to 3 respectively had the expansion coefficient of not greater than 20%. To the contrary, Controls 1 to 4 respectively had the expansion coefficient of greater than 20% except that Control 2 had the expansion coefficient of 19%. In Control 2, the ratio of the binder to the fibers was 50:50. In particular, in Controls 1 and 3 in which the ratio of 10%, i.e., not greater than 18%. This value was slightly smaller than 20% in Example 2 that did not contain the polyimide compound. This results suggest that in the sample containing the polyimide compound, a structure that can inhibit the expansion of the board was formed therein. Also, it is considered that polylactic acid forms the more complicated three-dimensional structure.

In Examples 1 to 3, the molecular weight of a synthetic resin contained in the molded board was increased over the molecular weight of polylactic acid before molding. From this result, it is considered that the heat during molding may induce a polymerizing reaction of polylactic acid and the compatible polymer polymerize or a polymerizing reaction of the compatible polymer. Conversely, in Controls 1 to 4 that did not contain the compatible polymer, the molecular weight of the synthetic resin contained in the molded board was nearly equal to the molecular weight of polylactic acid before molding. In addition, after exposure to the high temperature and humidity for 1,200 hours, in Examples 1 to 3, the reduction in molecular weight was not observed. However, in Controls 1 to 4, the molecular weight reduced by about 20,000 to 30,000, and as a result, the molecular weight of the synthetic resin fell below 100,000.

The invention claimed is:

1. A method for manufacturing a molded woody article comprising the step of:
pressing a pre-molding material that is prepared by dispersing a polylactic acid-base aliphatic polyester and a compatible copolymer into kenaf fibers, the compatible copolymer containing a first polymerizable monomer and a second polymerizable monomer as raw materials, wherein the pressing step is performed at a temperature that permit the polylactic acid-base aliphatic polyester to be changed to a softened state or a molten state,
wherein the first polymerizable monomer has a polymerizable double bond part and a hydrophilic group, and
wherein the second polymerizable monomer has a polymerizable double bond part and an epoxy group.

2. The method for manufacturing a molded woody article defined in claim 1, wherein the first polymerizable monomer comprises an alkylene oxide group as the hydrophilic group.

3. The method for manufacturing a molded woody article defined in claim 1, wherein a weight ratio of a sum of the first polymerizable monomer and the second polymerizable monomer to said polylactic acid-base aliphatic polyester is 0.1 to 10 wt %.

4. The method for manufacturing a molded woody article defined in claim 1, wherein the first polymerizable monomer comprises methoxypolyethylene glycol mono(meta) acrylate, and wherein the second polymerizable monomer comprises glycidyl (meta) acrylate.

5. The method for manufacturing a molded woody article defined in claim 1 comprising the step of applying the kenaf fibers with an aqueous dispersion of the polylactic acid-base aliphatic polyester and the compatible copolymer, thereby forming the pre-molding material.

6. The method for manufacturing a molded woody article defined in claim 1 comprising the step of mixing the kenaf fibers with binder fibers that contain the polylactic acid-base aliphatic polyester and the compatible copolymer, thereby forming the pre-molding material.

\* \* \* \* \*